United States Patent
Ananthanarayanan et al.

(10) Patent No.: US 8,713,521 B2
(45) Date of Patent: Apr. 29, 2014

(54) DISCOVERY, ANALYSIS, AND VISUALIZATION OF DEPENDENCIES

(75) Inventors: Rema Ananthanarayanan, New Delhi (IN); Vinatha Chaturvedi, Bangalore (IN); Vijil E. Chenthamarakshan, Kerala (IN); Prasad M. Deshpande, Mumbai (IN); Raghuram Krishnapuram, New Delhi (IN); Shajeer K. Mohammed, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 663 days.

(21) Appl. No.: 12/552,432

(22) Filed: Sep. 2, 2009

(65) Prior Publication Data
US 2011/0055811 A1    Mar. 3, 2011

(51) Int. Cl.
*G06F 9/44* (2006.01)
*G06F 9/45* (2006.01)

(52) U.S. Cl.
USPC ........... 717/120; 717/109; 717/113; 717/121; 717/143; 717/151; 709/224

(58) Field of Classification Search
None
See application file for complete search history.

(56) References Cited

U.S. PATENT DOCUMENTS

| | | | |
|---|---|---|---|
| 6,910,076 B2 * | 6/2005 | Lortz | 709/229 |
| 7,174,540 B2 | 2/2007 | Ondrusek et al. | |
| 7,210,128 B2 * | 4/2007 | Fallah et al. | 717/135 |
| 7,418,695 B2 * | 8/2008 | Lam et al. | 717/102 |
| 7,434,202 B2 | 10/2008 | Kramer | |
| 2002/0077979 A1 * | 6/2002 | Nagata | 705/40 |
| 2002/0103727 A1 * | 8/2002 | Tait et al. | 705/28 |
| 2002/0129011 A1 * | 9/2002 | Julien | 707/3 |
| 2003/0041098 A1 * | 2/2003 | Lortz | 709/203 |
| 2003/0058277 A1 * | 3/2003 | Bowman-Amuah | 345/765 |
| 2003/0229890 A1 * | 12/2003 | Lau et al. | 717/168 |
| 2005/0138160 A1 * | 6/2005 | Klein et al. | 709/223 |
| 2005/0289164 A1 * | 12/2005 | Yoon | 707/100 |
| 2006/0020912 A1 * | 1/2006 | Illowsky et al. | 717/103 |
| 2007/0112748 A1 * | 5/2007 | Angell et al. | 707/4 |
| 2007/0143744 A1 * | 6/2007 | Clemm et al. | 717/128 |
| 2008/0052675 A1 | 2/2008 | Wookey | |
| 2008/0059946 A1 * | 3/2008 | Harding et al. | 717/106 |
| 2008/0104570 A1 | 5/2008 | Chedgey et al. | |
| 2008/0133488 A1 * | 6/2008 | Bandaru et al. | 707/3 |
| 2008/0162498 A1 * | 7/2008 | Omoigui | 707/10 |
| 2008/0189308 A1 | 8/2008 | Sangal et al. | |
| 2009/0094542 A1 * | 4/2009 | McKelvey et al. | 715/765 |
| 2009/0138307 A1 * | 5/2009 | Belcsak et al. | 705/7 |
| 2009/0182499 A1 * | 7/2009 | Bravo | 701/207 |

(Continued)

OTHER PUBLICATIONS

Consens et al., Visualizing and querying software structures. In Proceedings of the 14th international Conference on Software Engineering (Melbourne, Australia, May 11-15, 1992) ICSE '92, ACM, New York, NY, 138-156.

(Continued)

*Primary Examiner* — Michael Sun (74) *Attorney, Agent, or Firm* — Ryan, Mason & Lewis, LLP (57) ABSTRACT

Product data pertaining to a plurality of products is gathered from a plurality of sources. Dependency information for the plurality of products is extracted from the product data. The dependency information is analyzed to determine dependencies for each product of the plurality of products. The dependencies for each product of the plurality of products are displayed to a user.

21 Claims, 10 Drawing Sheets

(56) References Cited

U.S. PATENT DOCUMENTS

| | | | |
|---|---|---|---|
| 2009/0234823 A1* | 9/2009 | Wong | 707/4 |
| 2009/0254877 A1* | 10/2009 | Kuriakose et al. | 717/105 |
| 2010/0153908 A1* | 6/2010 | Sarkar et al. | 717/104 |

OTHER PUBLICATIONS

Panagiotis et al., A Tool for Understanding Multi-Language Program Dependencies, ICPC, pp. 64, 11th IEEE International Workshop on Program Comprehension (IWPC'03), 2003.

Holt et al., GASE: visualization software evolution-in-the-large. In Proceedings of the 3rd Working Conference on Reverse Engineering (WCRE'96) (Nov. 8-10, 1996). WCRE. IEEE Computer Society, Washington, DC, 163.

Tuura et al., Ignominy—A tool for software dependency and metrics analysis with examples from large HEP packages; Computing in high energy and nuclear Physics, 2001, China.

Falke et al., tTe Dominance Tree in Visualizing Software Dependencies. In Proceedings of the 3rd IEEE international Workshop on Visualization Software for Understanding and Analysis (Sep. 25-25, 2005) VISSOFT. IEEE Computer Society, Washington, DC, 24.

Dependency Finder, http://depfind.sourceforge.net/ pp. 1.

GrammaTech: Products: CodeSurfer, http://www.grammatech.com/products/codesurfer/overview.html.

IBM Software—Rational Software Analyzer, http://www-01.ibm.com/software/awdtools/swanalyzer/.

Rpm—Trac, http://www.rpm.org/ pp. 1-2.

Lee et al., Feature Dependency Analysis for Product Line Component Design, J. Bosch and C. Krueger (Eds.): ICSR 2004, LNCS 3107, pp. 69-85, 2004.

Bohner et al., Impact Analysis in the Software Change Process: A Year 2000 Perspective, 1996 IEEE, pp. 42-51.

Gu et al., A Model-Based Approach to System-Level Dependency and Real-Time Analysis of Embedded Software, Proceedings of the 9th IEEE Real-Time and Embedded Technology and Applications Symposium (RTAS'03), pp. 1-8.

* cited by examiner

DISCOVERY, ANALYSIS, AND VISUALIZATION OF DEPENDENCIES

FIELD OF THE INVENTION

The present invention relates to the electrical, electronic and computer arts, and, more particularly, to dependency analysis and the like.

BACKGROUND OF THE INVENTION

Software solutions typically include multiple products that need to work together. Products have various attributes, such as version, edition, bitness (that is, word size in bits), set of features supported, platforms supported, and so on. A product may have dependencies on other products or components. These dependent products may in turn have another set of dependencies. Dependencies can be of various types such as pre-requisite, supported software, bundled, and the like. Dependencies of a product are typically determined by the attributes of the product, such as the version, edition, features supported, and so on. For example, by changing the version or choosing only a subset of the features, the dependencies of a product can be reduced. Each product also has a lifecycle that includes its release date, supported date and end of life date. When a product reaches end of life, it is necessary to find a new version of the same product or a different product to replace it in such a way that the solution as a whole is still compatible. The dependency information is typically spread over multiple sources in various formats such as text, hypertext markup language (html), portable document format (pdf), and the like.

SUMMARY OF THE INVENTION

Principles of the invention provide techniques for discovery, analysis, and visualization of dependencies. In one aspect, an exemplary method (which can be computer-implemented) includes the steps of gathering, from a plurality of sources, product data pertaining to a plurality of products; extracting, from the product data, dependency information for the plurality of products; analyzing the dependency information to determine dependencies for each product of the plurality of products; and displaying the dependencies for each product of the plurality of products to a user.

One or more embodiments of the invention or elements thereof can be implemented in the form of a computer product including a computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a computer readable storage medium (or multiple such media).

One or more embodiments of the invention may offer one or more of the following technical benefits:

Ability to represent both AND and OR kinds of dependencies
Ability to filter dependencies based on selections on multi-valued attributes
Ability to specify lifecycle information, cost, and the like and optimize on various factors
Ability to perform impact analysis These and other features, aspects and advantages of the invention will become apparent from the following detailed description of illustrative embodiments thereof, which is to be read in connection with the accompanying drawings.

DETAILED DESCRIPTION OF PREFERRED EMBODIMENTS

As noted, software solutions typically include multiple products that need to work together. Products have various attributes, such as version, edition, bitness, set of features supported, platforms supported, and so on. A product may have dependencies on other products or components. These dependent products may in turn have another set of dependencies. Dependencies can be of various types such as pre-requisite, supported software, bundled, and the like. Dependencies of a product are typically determined by the attributes of the product, such as the version, edition, features supported, and so on. For example, by changing the version or choosing only a subset of the features, the dependencies of a product can be reduced. Each product has a lifecycle that includes its release date, supported date and end of life date. The dependency information is typically spread over multiple sources in various formats such as text, hypertext markup language (html), portable document format (pdf), and the like.

One or more embodiments provide a system to discover these dependencies, analyze them programmatically, visualize them in various ways, and perform impact analysis (for example, if a dependency is dropped, what are the features that will not be supported). Non-limiting exemplary applications include:

While porting applications to new platforms, performing complex analysis based on the dependency set, life cycle and/or interdependencies of products Obtaining, for solution architects, a stack analysis report of various products in a given solution, showing the dependencies among products Performing scheduling of releases based on the release schedule of dependent products Enhancing, and preferably optimizing, the porting cost by leveraging the already available dependencies on a target platform Minimizing cost of new solutions by reusing existing products that provide the required features Automating product installation of full stacks of products, where dependency between products is known.

Consider, for example, the non-limiting exemplary application of one or more embodiments of the invention to the porting of software products. In one or more embodiments, determine what components to port for a given top-level requirement of products to port. Each product will typically have a set of dependent products that need to be ported. Since there are multiple options, interactive analysis of the dependencies will help in picking the most suitable option. In one particular example, it was observed that while porting certain modeling software to a new platform, the porting team took twenty months to port, out of which two months were spent on figuring out dependencies. This two month effort could be saved using one or more embodiments of the invention.

One or more embodiments advantageously permit a "what-if" analysis, wherein it is possible to evaluate "what-if" scenarios to allow simulating solution models (as opposed to trial and error). For example, a determination can be made as to what happens if a particular product is unavailable on the new platform. The impact analysis feature, discussed elsewhere herein, is potentially useful in this scenario; for example, to save wasted effort. One or more embodiments are also useful in connection with cost optimization; for example, to determine what versions of products should be ported in order to avoid porting multiple versions of dependent products and/or components, and/or to reduce or preferably minimize the overall porting cost with dependency constraints in mind.

Another non-limiting exemplary application of one or more embodiments of the invention relates to solution architecting (that is, designing a new solution). It may be very difficult for field personnel (or other parties) to deal with the vast range of technology options. Knowing which product address the customer's business requirements is challenging. Significant questions may include:

What product should be deployed to address the customer's business requirements

In the solution architecture, whether all the products work together

What if it is necessary to replace one product or a version of the product with another one How to reduce, and preferably optimize, the cost of the solution based on the cost of individual products, pre-existence of some products, and/or the cost of deploying the solution In at least some cases, embodiments of the invention, employed for solution architecting, can provide dependency data to suitable compatibility analysis software, which may be used to decide on a plan for upgrading products in a particular deployment. In some instances, such software:

Identifies version compatibility issues for an IT environment

Assesses compatibility risks before upgrade

Recommends compatible products for a solution

Such software may take a topology—software or hardware nodes, and their relationship—as input, and then check compatibility among those nodes, and, if there are incompatibilities, advises how to keep the topology compatible. Such software may also identify specific, compatible versions for to-be-determined components—each represents one of a collection of candidate product versions—in a topology.

Still another non-limiting exemplary application of one or more embodiments of the invention relates to retail. Dependency analysis is useful in other domains as well. For example, consider electronic products such as television, digital video disk (DVD) players, speakers, music systems, compact disks (CDs), and the like. There are dependencies between products—certain products will work with only certain other products. For example, a TV with and HDMI (High-Definition Multimedia Interface) input will need a DVD player that has an HDMI output. Dependency analysis can be provided as a tool to potential customers to help them select products to buy.

Exemplary Architecture

Figure 1:
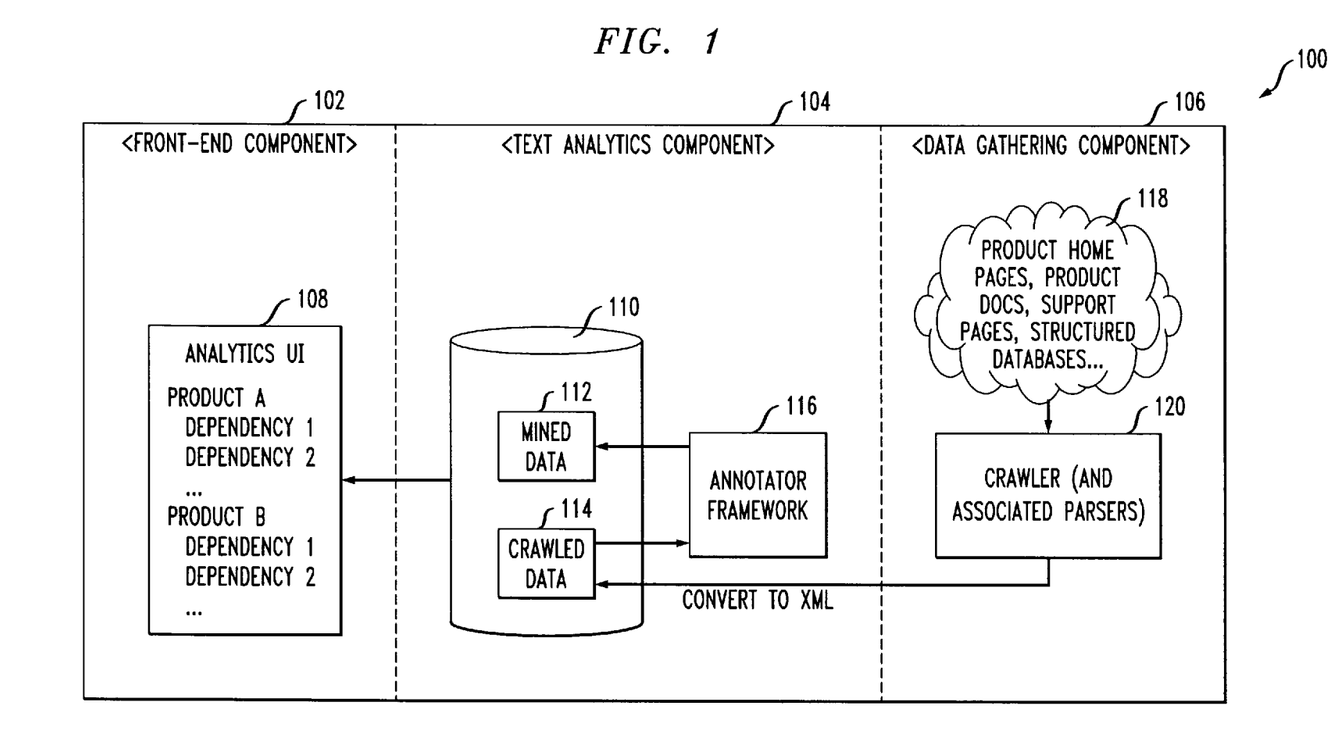
FIG. 1 presents a block diagram of an exemplary system, according to an aspect of the invention.

FIG. 1 depicts an exemplary architecture 100 of an end-to-end dependency information management system, according to an aspect of the invention. The system preferably includes a front-end component 102, a text analytics component 104, and a data gathering component 106. One or more sources of data 118 may include product home pages, product documentation, support pages, structured databases, and so on; data is gathered from one or more of these sources using a suitable crawler 120, and, as needed, one or more parsers. The data obtained by the crawler is converted, as needed, to extensible markup language (XML) and stored in a crawled data portion 114 of a data repository 110. Suitable annotation can then be provided with annotator framework 116, and the annotated data stored in a mined data portion 112 of repository 110. The dependencies can be displayed to one or more users by employing user interface 108 of front end 102. In some embodiments, the dependency data can be extracted from different structured sources directly; the annotator module 116 can be dropped in these cases.

Thus, in one or more embodiments combine a crawler 120 to discover data, text analytics 104 to extract dependency information, a schema to represent the dependency information, and analytics and a suitable user interface (UI) 108 for dependency analysis. Text analytics component 104 preferably includes rules for identifying synonyms of a product.

In one or more embodiments, crawler 120 may be any standard existing web crawler, such as Apache Nutch, IBM Omnifind, or the like. The crawler can be configured to crawl the desired pages. Furthermore, in one or more instances, the associated parsers are standard components that are used to parse specific file formats such as PDF, MS Word, and so on.

Element 110 is a suitable persistent storage, crawled data 114 is data from the crawler and parsers that has been converted to XML, and mined data is crawled data that has been annotated in block 116.

The text analytics component 104 is preferably used to extract entities such as product names, version numbers, their dependencies, and the like from unstructured documents such as web pages. It includes an annotator component 116 that will identify the mentions of these entities in the web pages. The annotator component 116 can be implemented using statistical or rule based methods. Once the data from the unstructured format is extracted, it can be stored in a structured format in a database. Various analytics can be performed by querying the database using some standard query languages like SQL. The user interface 108 can be implemented in a variety of ways including, for example, as a web application using HTML and/or Javascript or as an Applet.

One or more embodiments preferably allow specification of AND/OR dependencies, and handle dependencies of many types, including dependencies having attributes. Preferably, one or more embodiments address multiple versions that are substitutable, and allow filtering on multi-valued attributes. In at least some instances, embodiments afford the ability to specify lifecycle and optimize on the fastest "Go to Market" path, and/or the ability to specify cost and optimize on cost. In some cases, a dependency may propagate some features to its children. Advantageously, impact analysis reveals how features are impacted as dependencies are changed. Preferably, one or more embodiments allow the ability to restrict analysis based on the depth of relationships (restricting the transitivity).

Figure 2:
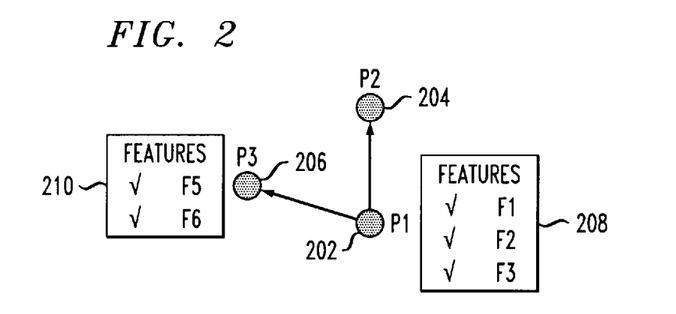
FIGS. 2-4 show non-limiting examples of impact analysis, according to another aspect of the invention.
Figure 3:
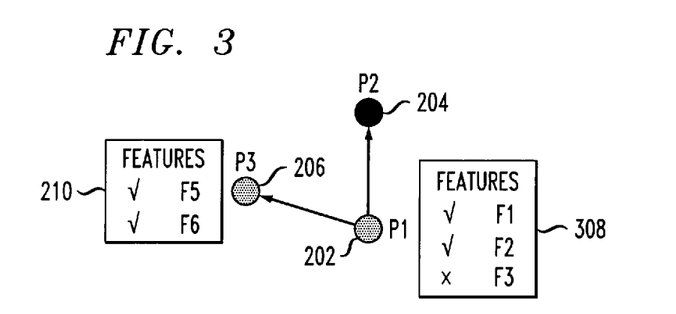

FIGS. 2 and 3 provide a non-limiting example illustrating impact analysis, that is, how features are affected as dependencies change. If a dependent product is unavailable, the main product may still be supportable, but with restricted features. In a preferred approach, the analytical UI 108 will allow performing impact analysis due to unavailability of certain products and/or dropping features on certain products. In FIG. 2, there are three products, P1, P2, and P3, numbered 202, 204, and 206, respectively. Product P1 has features 208; namely, feature F1, feature F2, and feature F3. Product P2 has features 210; namely, feature F5, and feature F6. Note that in FIG. 3, like elements have received the same reference number as in FIG. 2, except that the feature set of product P1 has been renumbered as 308 to reflect the following condition. If P2 is unavailable, as indicated by the darker shading of P2 in FIG. 3 as opposed to FIG. 2, feature F3 of P1 cannot be supported, as indicated by the "x" next to F3 in feature set 308.

Figure 4:
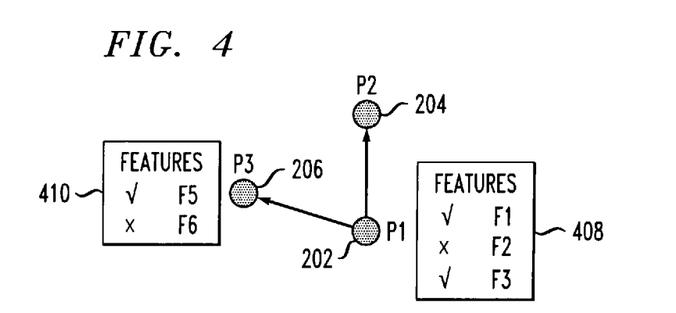

The example of impact analysis continues in FIG. 4. Note that in FIG. 4, like elements have received the same reference number as in FIG. 2, except that the feature sets of products P1 and P3 have been renumbered as 408 and 410, respectively, to reflect the following condition. If feature F6 of P3 is dropped, as indicated by the "x" next to F6 in feature set 410, feature F2 of P1 cannot be supported, as indicated by the "x" next to F2 in feature set 408.

One or more embodiments of the invention thus provide a system and method to discover, extract and analyze dependencies between entities (using, for example, components 106, 104, and 102, respectively). In at least some cases, the method of discovery includes crawling (using, for example, crawler 120) various sources 118 on the world-wide web (that is, a system of interlinked hypertext documents accessed via a global system of interconnected computer networks that use the standardized Internet Protocol Suite (transfer control protocol/internet protocol or TCP/IP), commonly called the Internet). Examples of sources 118 include product home pages and product documentation, support pages, structured databases, and other sources.

Furthermore, in at least some instances, the method of extracting may be carried out, for example, with text analytics component 104, and may include identifying system requirement pages, as well as identifying and resolving mentions of entities in a page, taking into account synonyms. The analysis may, for example, be carried out with component 104 and presented to one or more users via component 102. The analysis may include, for example, techniques to analyze based on one or more of attributes, features, costs, lifecycle, and the like.

Preferably, user interface 108 allows for visualizing dependencies in an easy to use interface and/or the ability to specify the type of dependency (for example, AND/OR) through the user interface. Furthermore, user interface 108 preferably also provides the ability to specify the lifecycle of a dependent product, the ability to specify the cost of a dependent product, and/or the ability to perform optimization based on the cost and availability of a product. Even further, user interface 108 preferably provides the ability to specify attributes of a dependency that can be propagated, the ability to filter based on multiple values of an attribute of a dependency, the ability to perform impact analysis by dropping and adding multiple dependencies, and/or the ability to visualize dependencies with different levels of transitivity.

Figure 5:
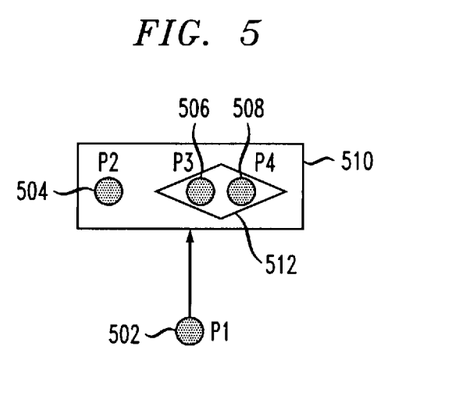
FIG. 5 shows exemplary display of ""AND"" and ""OR"" dependencies, according to still another aspect of the invention.

A product can typically have many dependency sets, each of which is of "AND" type or "OR" type. An "AND" dependency implies that the dependency applies to all the products in the dependency set. By way of a non-limiting example, in at least some instances, IBM Websphere® Business Monitor software is dependent on IBM DB2 Alphablox® software AND IBM Websphere® Portal software (registered marks of International Business Machines Corporation (IBM), Armonk, N.Y., USA). These software products are exemplary and non-limiting, and are available from IBM. An "OR" dependency implies that any of the products in the dependency set can satisfy the dependency. For example, IBM Websphere® Application Server version 6.0 software is dependent on IBM DB2 universal database version 8.1 software OR IBM DB2 universal database version 8.2 software. With reference now to FIG. 5, product P1, numbered 502, is dependent on product P2, numbered 504, OR (product P3, numbered 506, AND product P4, numbered 508), where an "OR" dependency is symbolized by a rectangle 510 and an "AND" dependency is symbolized by a diamond 512

Dependencies can be of many types, and each dependency can have various attributes. Dependencies can be classified into various types based on these attributes. For example, the types of dependencies for software products are typically: pre-requisite and optional. Furthermore, the attributes for software product dependencies are typically: container (on top of); run on the same system; and interacts with each other (in a remote or local environment). Packaging attributes may include, for example, whether the dependency is bundled with the main product, and license restrictions on the bundle.

In many instances, the most common kind of OR dependency is that on different versions of a product that are substitutable. For example, IBM Websphere® Application Server version 6.0 software is dependent on IBM DB2 universal database version 8.1 software OR IBM DB2 universal database version 8.2 software. In one or more embodiments, group multiple versions of a product in the UI so it is easy to visualize the dependency. For example, in FIG. 6, product P1, numbered 602, is dependent on product P2 v1, numbered 604, OR P2 v2, numbered 606, OR P2 v3, numbered 608.

Figure 7:
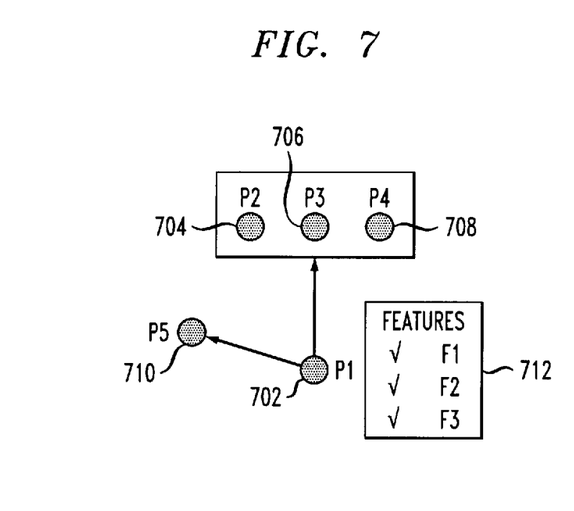
FIGS. 7-9 present exemplary filtering on multi-values attributes, according to a further aspect of the invention.
Figure 8:
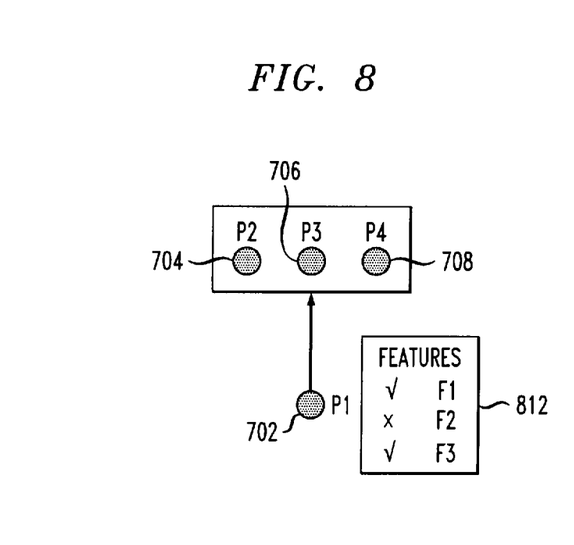

In at least some instances, filtering on multi-valued attributes is desirable. Products typically have attributes such as manufacturer, brand, version, features supported, bitness, and so on. The dependencies are typically determined by the attributes of the product. In at least some instances, dependencies can be filtered in two ways, namely: (i) by selecting a subset of features of the product which is being analyzed; and (ii) by using a global filter based on product attributes. With respect to (ii), for example, consider products only from IBM (Manufacturer="IBM"). If a dependency cannot be satisfied due to this filter, it will be marked in the UI. With reference to FIGS. 7 and 8, initially, as in FIG. 7, product P1, numbered 702, has a dependency on product P2, numbered 704, OR product P3, numbered 706, OR product P4, numbered 708. Product P1 also has a dependency on product P5, numbered

710. Further, product P1 has a feature set 712, with features F1, F2, and F3. Note that in FIG. 8, like elements have received the same reference number as in FIG. 7, except that the feature set of product P1 has been renumbered as 812 to reflect the following condition. On dropping feature F2, as indicated by the "x" in set 812, the dependency of P5 gets dropped.

Figure 9:
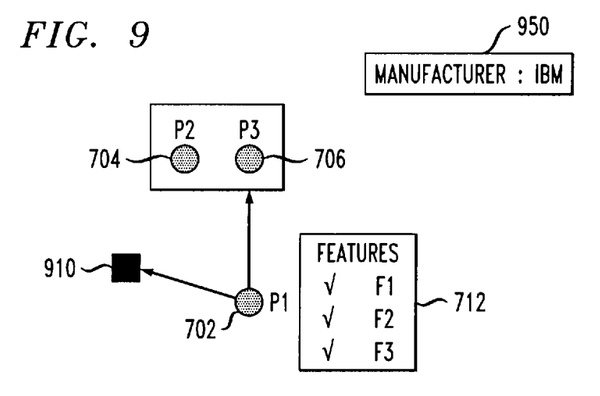

Again considering FIG. 7 as a baseline, and with reference now to FIG. 9, on adding the filter Manufacturer="IBM," as per block 950, products P4 and P5 are dropped. Product P4 is substitutable with product P2 and product P3 (OR dependency), whereas product P5 is not substitutable, due to which the dependency can no longer be satisfied, hence the dark-shaded square 910 is depicted in lieu of product P5. Note that in FIG. 9, like elements have received the same reference number as in FIG. 7, except as noted with respect to dark-shaded square 910.

Figure 10:
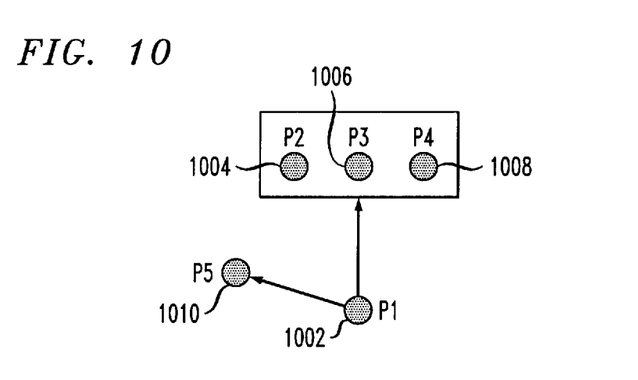
FIGS. 10 and 11 depict exemplary display of product life cycle considerations, according to a still further aspect of the invention.
Figure 11:
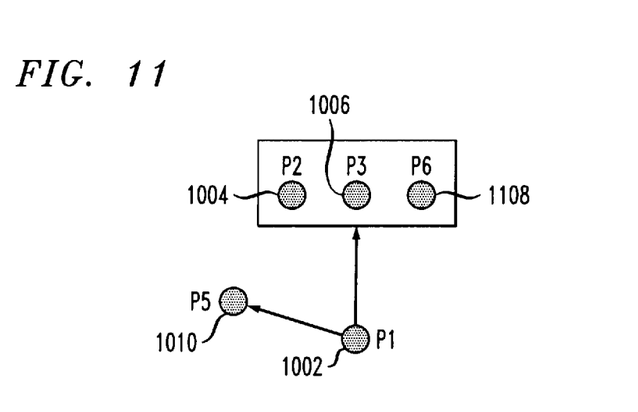

At least some embodiments of the invention provide the ability to specify lifecycle and optimize on the fastest 'Go to Market' path. Typically, each product has a lifecycle that includes availability date, end of life date, and end of support date. It is therefore desirable to be able to visualize dependencies in the future and plan accordingly. Based on the availability of dependent products, in one or more instances, decide what version of dependent products to support while planning a new release of a product. FIG. 10 provides an example of current dependencies for a product P1, numbered 1002. Initially, as in FIG. 10, product P1, numbered 1002, has a dependency on product P2, numbered 1004, OR product P3, numbered 1006, OR product P4, numbered 1008. Product P1 also has a dependency on product P5, numbered 1010. At some point in the future (by way of example and not limitation, perhaps six months), product P4 reached end of life, and product P6, numbered 1108, is available as a replacement, as shown in FIG. 11. Note that in FIG. 11, like elements have received the same reference number as in FIG. 10.

Figure 12:
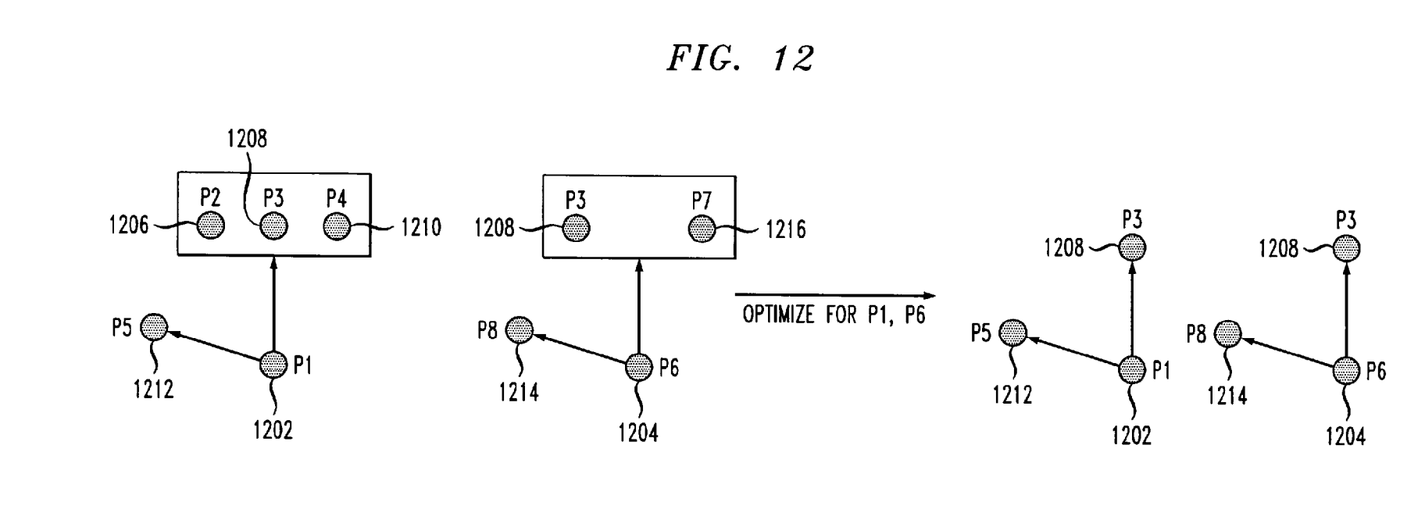
FIG. 12 depicts exemplary cost optimization, according to yet a further aspect of the invention.

One or more instances of the invention afford the ability to specify cost and optimize on cost. There can be a cost associated with each product. The cost could have different meanings in different contexts, for example, the cost of porting the product to a new platform, the cost of buying the product while putting together a solution, and so on. Given a set of products that are required, in one or more embodiments, the system will select a set of dependent products that minimize the cost. For example, with reference to FIG. 12, suppose products P1, numbered 1202, and P6, numbered 1204, are required. Product P1 is dependent on product P2, numbered 1206, OR product P3, numbered 1208, OR product P4, numbered 1210. Product P1 is also dependent on product P5, numbered 1212. Product P6 is dependent on product P8, numbered 1214. Product P6 is also dependent on product P3 OR product P7, numbered 1216. The cost of each product is shown in the table below:

| P1 | 10 |
| P2 | 4 |
| P3 | 6 |
| P4 | 7 |
| P5 | 8 |
| P6 | 9 |
| P7 | 8 |
| P8 | 5 |

After optimizing cost for P1 and P6, the configuration at the right side of FIG. 12 is obtained, employing P1, P6, P5, P8, and P3. The total cost is thirty-eight, since P3 is common to both P1 and P6.

Figure 13:
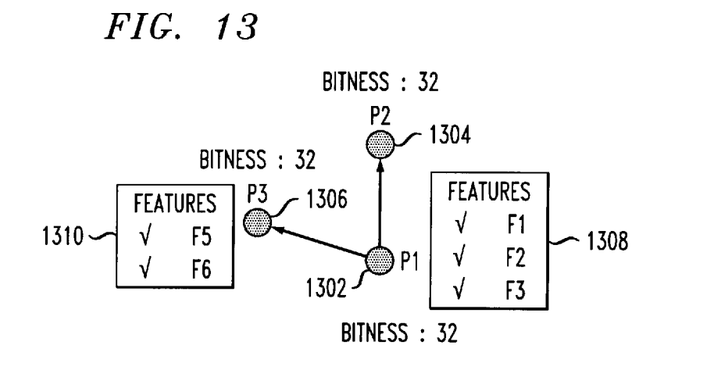
FIGS. 13 and 14 depict exemplary dependency propagation, according to an even further aspect of the invention.
Figure 14:
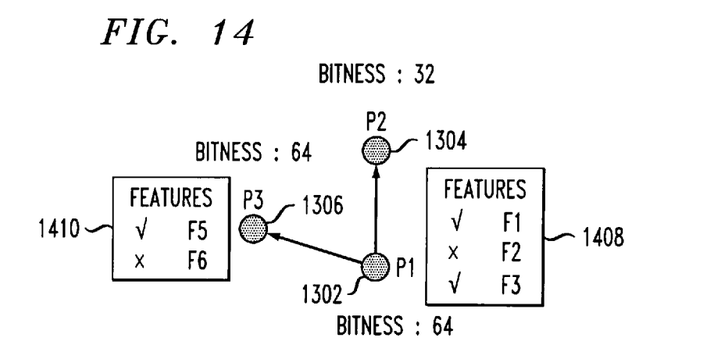

In at least some cases, a dependency or dependencies may propagate some features to its, or their, children. In FIG. 13, P1 is the parent and the P2 and P3 are the dependent products, also referred to as children. Restricting features of a product may lead to restricting features on the dependent products. In addition, attributes of the product may get propagated to the dependent products. The UI 108 preferably allows the user to experiment with various attributes and features. For example, with respect to FIGS. 13 and 14, consider initially products P1, P2, and P3, as shown in FIG. 13, numbered 1302, 1304, and 1306 respectively. Each of the products has a bitness of 32, and product P1 has a set of features F1, F2, and F3, numbered 1308; while product P3 has a set of features F5 and F6, numbered 1310. As seen in FIG. 14, changing the bitness of P1 from 32 to 64 requires the bitness of P3 to change from 32 to 64 as well. However, P2 can still be 32 bit. Dropping F2 on P1 enables dropping of feature F6 for P3, as shown by the "x" notations in feature sets 1408 and 1410 in FIG. 14 (where similar elements have otherwise received the same reference character as in FIG. 13).

Figure 15:
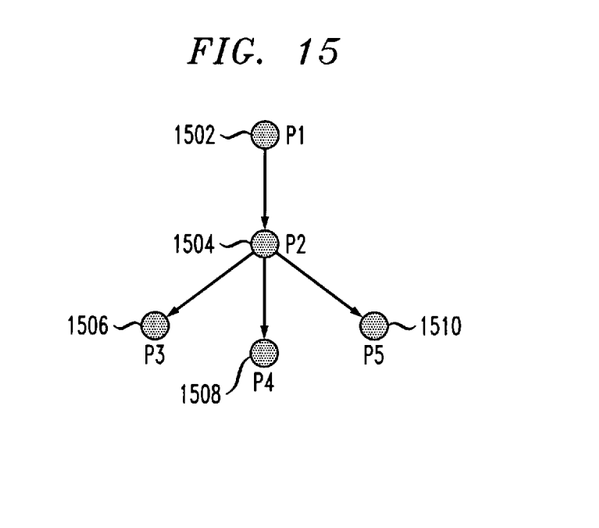
FIGS. 15 and 16 depict exemplary transitivity restriction, according to an additional aspect of the invention.
Figure 16:
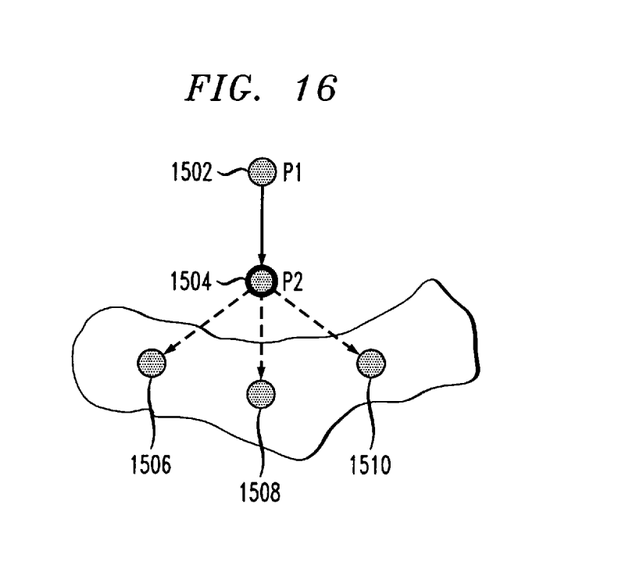

One or more embodiments provide the ability to restrict analysis based on the depth of relationships (that is, restricting the transitivity). A relation is said to be transitive if it satisfies the condition that if A is related to B and B is related to C, then A is related to C. Dependencies between products are transitive by nature. In the example of FIG. 15, product P1, numbered 1502, depends on product P2, numbered 1504, which in turn depends on products P3, P4 and P5, numbered, respectively, 1506, 1508, and 1510. FIG. 16 presents an alternate view of the same dependency shown in FIG. 15, where the visualization shows that P1 requires P2, and "does not care" what the requirements of P2 are (in this exemplary instance, by having a dark circle around P2 and only dotted connectivity to P3, P4, and P5).

Thus, one or more embodiments provide one or more, and preferably all, of the following:
- automated dependency information gathering (for example, via component 106)
- automated dependency information extraction (for example, via component 104)
- visualization and analysis of dependency information, preferably with representation of dependencies at the software, component, and/or solution levels (for example, via component 102)

Figure 17:
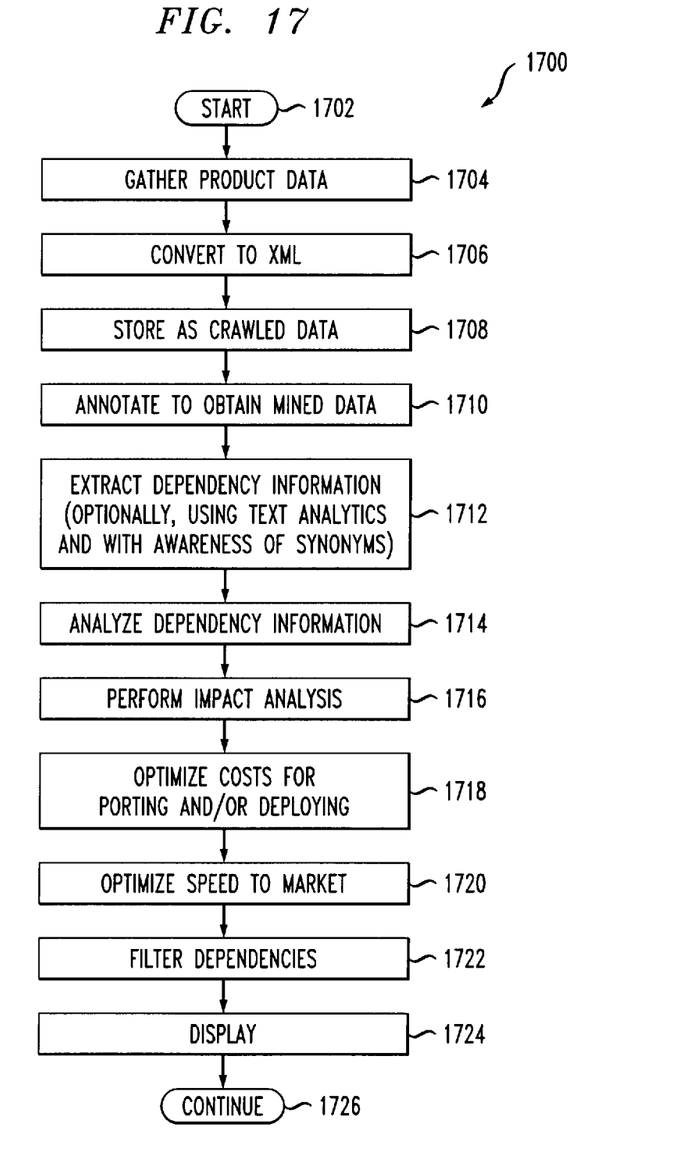
FIG. 17 is a flow chart of exemplary method steps, according to another additional aspect of the invention.

In view of the discussion thus far, and with reference now to FIG. 17, an exemplary method 1700, according to an aspect of the invention, will be discussed. After beginning at step 1702, the method includes gathering, from a plurality of sources, product data pertaining to a plurality of products, as in step 1704. This step can be carried out, for example, using data gathering component 106. The method also includes extracting, from the product data, dependency information for the plurality of products, as per step 1712. This step can be carried out, for example, with text analytics component 104. The method further includes analyzing the dependency information to determine dependencies for each product of the plurality of products, as per step 1714. This step can be carried out, for example, with text analytics component 104 cooperating with front-end component 102. The method still further includes displaying the dependencies for each product of the plurality of products to a user, as per step 1724. This step can be carried out, for example, using front end component 102. Processing continues at step 1726.

The product data may pertain, for example, to consumer products, computer products, and the like. In at least some cases, the gathering step 1704 includes employing a web crawler to gather the product data from world wide web and/or intranet product home pages, product documents on the world wide web and/or intranet, support pages on the world wide web and/or intranet, and/or structured databases on the world wide web and/or intranet. In general, product data can be obtained from any source readable by a computer program.

In at least some instances, the extracting step 1712 includes applying text analytics to the product data. In one or more embodiments, additional steps can include converting the product data to extensible markup language, as in step 1706, and storing the converted product data as crawled data (for example, in region 114 of data store 110), as in step 1708. The step of applying the text analytics could include annotating the crawled data to obtain mined data (step 1710 can be thought of as part of step 1712). Framework 116 could carry out the annotation, with the mined data stored in location 112 of data store 110. The analyzing step 1714 could be carried out on the mined data. Note that the XML conversion shown in FIG. 1 on the arrow connecting blocks 120 and 114 could be carried out, for example, by a program, not explicitly shown, which can be considered as part of crawler 120—such program takes the results of the crawl, converts the same into XML, and stores the same it into database 114 to be used by the text analytics component 104.

Optionally but preferably, extracting step 1712 includes identifying synonyms of a given one of the products. The synonyms are generated, for example, in a rule based manner. The common ways in which synonyms of a product can occur include use of acronyms, dropping the brand name, dropping the company name, and so on. These are encoded as rules. The rules are applied to a master list of product names to generate all possible synonyms of these names. This expanded list is used in the matching process to identify the synonyms.

As shown at step 1716, an optional step includes performing an impact analysis on the dependency information to determine the impact of at least one dependency change. The impact could be displayed to the user in step 1724. In some cases, at least some of the products have multiple features, and the impact analysis includes determining how at least some of the features are impacted by the dependency change(s).

As noted, in some cases, the product data pertains to computer software products. As shown in step 1718, in some cases, an additional step includes optimizing cost for porting the computer software products from a first system to a second system, and/or optimizing cost for architecting a new solution with at least some of the computer software products. As shown in step 1720, in some cases, an additional step includes optimizing speed to market for architecting a new solution with at least some of the computer software products. As used herein, including the claims, "optimizing" a certain parameter is not necessarily intended to be limited to obtaining the "one best" result, but is intended to also include cases where the value of the parameter (for example, cost or time to deployment) is improved using techniques herein.

Figure 6:
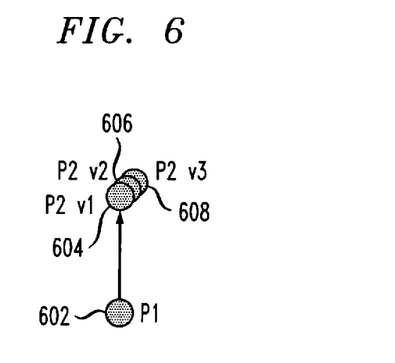
FIG. 6 shows exemplary display of multiple versions of a product that are substitutable, according to yet another aspect of the invention.

The dependencies extracted in step 1712 can include, for example, "AND" dependencies and/or "OR" dependencies. In at least some cases, at least some of the OR dependencies include dependencies on multiple substitutable versions of a single product. In such cases, the displaying step 1724 may include grouping the multiple versions together for display as shown in FIG. 6.

In at least some cases, an additional step 1722 can include filtering the dependencies based on at least one attribute of at least one product of the plurality of products. As discussed with respect to FIG. 9, in case a given dependency cannot be satisfied due to the filtering, the dependency that cannot be satisfied can be marked during the displaying step 1724. Furthermore, as discussed with respect to FIG. 16, in some cases, in the displaying step 1724, display of at least some of the dependencies is limited to a specified depth.

Steps 1716-1722 can be carried out, for example, by running analysis on the dependencies discovered using text analytics component 104 according to the action requested by the user using the front-end component 102.

As shown in FIGS. 13 and 14, in some cases, one product propagates at least one feature to a child product. Such propagation may, if desired, be displayed in the displaying step.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 18:
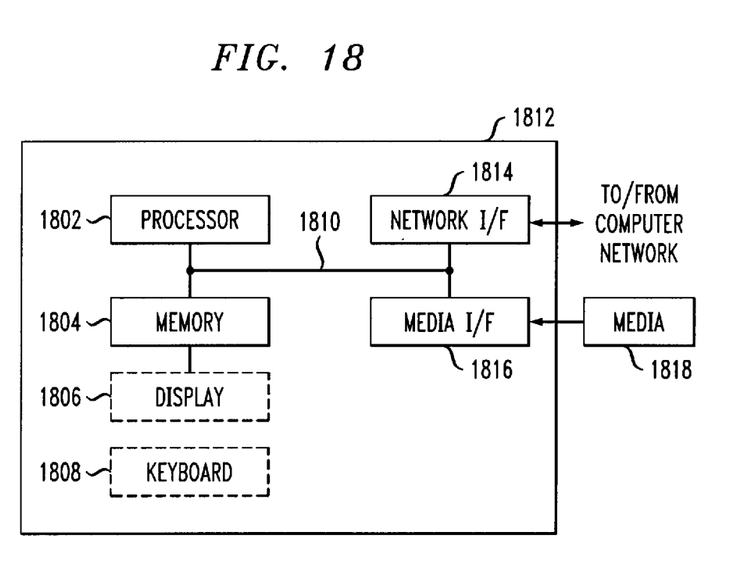
FIG. 18 depicts a computer system that may be useful in implementing one or more aspects and/or elements of the invention.

One or more embodiments can make use of software running on a general purpose computer or workstation. With reference to FIG. 18, such an implementation might employ, for example, a processor 1802, a memory 1804, and an input/output interface formed, for example, by a display 1806 and a keyboard 1808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1802, memory 1804, and input/output interface such as display 1806 and keyboard 1808 can be interconnected, for example, via bus 1810 as part of a data processing unit 1812. Suitable interconnections, for example via bus 1810, can also be provided to a network interface 1814, such as a network card, which can be provided to interface with a computer network, and to a media interface 1816, such as a diskette or CD-ROM drive, which can be provided to interface with media 1818.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1802 coupled directly or indirectly to memory elements 1804 through a system bus 1810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1808, displays 1806, pointing devices, and the like) can be coupled to the system either directly (such as via bus 1810) or through intervening I/O controllers (omitted for clarity).

Network adapters such as network interface 1814 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1812 as shown in FIG. 18) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 1818 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 1. The method steps can then be carried out using the distinct software modules and/or sub-modules of the system, as described above, executing on one or more hardware processors 1802. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    gathering, from a plurality of unstructured document sources, product data pertaining to a plurality of products;
    extracting, from the product data, dependency information for the plurality of products by identifying mentions of product-related entities and pre-determined synonyms of the product-related entities thereof from the plurality of unstructured document sources;
    analyzing the dependency information to determine dependencies for each product of the plurality of products;
    displaying the dependencies for each product of the plurality of products to a user, wherein said displaying comprises visualizing the dependencies via a user interface, wherein the user interface allows for user specification of dependency type and user specification of dependency-related variables comprising lifecycle of a product, cost of a product, and availability of a product; and
    storing the dependencies for each product in a structured format in a database.

2. The method of claim 1, wherein, in the gathering step, the product data pertains to consumer products.

3. The method of claim 1, wherein, in the gathering step, the product data pertains to computer products.

4. The method of claim 1, wherein the gathering step comprises employing a web crawler to gather the product data from at least one of:
    world wide web product home pages;
    intranet product home pages;
    product documents on the world wide web;
    intranet product documents;
    support pages on the world wide web;
    intranet support pages;
    structured databases on the world wide web; and
    intranet structured databases.

5. The method of claim 4, wherein the extracting step comprises applying text analytics to the product data.

6. The method of claim 5, further comprising converting the product data to extensible markup language and storing the converted product data as crawled data, wherein the step of applying the text analytics comprises annotating the crawled data to obtain mined data, and wherein the analyzing step is carried out on the mined data.

7. The method of claim 1, wherein said extracting step includes identifying synonyms of a given one of the products.

8. The method of claim 1, further comprising:
    performing an impact analysis on the dependency information to determine an impact of at least one dependency change; and
    displaying the impact to the user.

9. The method of claim 8, wherein at least some of the products have multiple features, and wherein the impact analysis comprises determining how at least some of the features are impacted by the at least one dependency change.

10. The method of claim 1, wherein, in the gathering step, the product data pertains to computer software products, further comprising optimizing cost for porting the computer software products from a first system to a second system.

11. The method of claim 1, wherein, in the gathering step, the product data pertains to computer software products, further comprising optimizing cost for architecting a new solution with at least some of the computer software products.

12. The method of claim 1, wherein, in the analyzing step, the dependencies comprise at least AND dependencies and OR dependencies.

13. The method of claim 12, wherein at least some of the OR dependencies comprise dependencies on multiple substitutable versions of a single product, and wherein the displaying step comprises grouping the multiple versions together for display.

14. The method of claim 1, wherein, in the gathering step, the product data pertains to computer software products, further comprising optimizing speed to market for architecting a new solution with at least some of the computer software products.

15. The method of claim 1, further comprising:
    filtering the dependencies based on at least one attribute of at least one product of the plurality of products; and
    in case a given dependency cannot be satisfied due to the filtering, marking the dependency that cannot be satisfied during the displaying step.

16. The method of claim 1, wherein, in the displaying step, display of at least some of the dependencies is limited to a specified depth.

17. The method of claim 1, wherein at least a first one of the products propagates at least one feature to at least one other one of the products, which is a child of the first one of the products, and wherein the propagation of the feature is displayed in the displaying step.

18. The method of claim 1, further comprising providing a system, wherein the system comprises distinct software modules, each of the distinct software modules being embodied on a computer-readable storage medium, and wherein the distinct software modules comprise a front-end module, a text analytics module, and a data gathering module;

wherein:

the gathering of the product data is carried out by the data gathering module executing on at least one hardware processor;

the extracting of the dependency information is carried out by the text analytics module executing on the at least one hardware processor;

the analyzing of the dependency information is carried out by the text analytics module and the front end module executing on the at least one hardware processor; and the displaying the dependencies is carried out by the front end module executing on the at least one hardware processor.

19. A computer program product comprising a computer readable storage medium having computer readable program code embodied therewith, said computer readable program code comprising:

computer readable program code configured to gather, from a plurality of unstructured document sources, product data pertaining to a plurality of products;

computer readable program code configured to extract, from the product data, dependency information for the plurality of products by identifying mentions of product-related entities and pre-determined synonyms of the product-related entities thereof from the plurality of unstructured document sources;

computer readable program code configured to analyze the dependency information to determine dependencies for each product of the plurality of products;

computer readable program code configured to display the dependencies for each product of the plurality of products to a user, wherein said displaying comprises visualizing the dependencies via a user interface, wherein the user interface allows for user specification of dependency type and user specification of dependency-related variables comprising lifecycle of a product, cost of a product, and availability of a product; and computer readable program code configured to store the dependencies for each product in a structured format in a database.

20. An apparatus comprising:

a memory; and at least one processor, coupled to the memory, and operative to:

gather, from a plurality of unstructured document sources, product data pertaining to a plurality of products;

extract, from the product data, dependency information for the plurality of products by identifying mentions of product-related entities and pre-determined synonyms of the product-related entities from the plurality of unstructured document sources;

analyze the dependency information to determine dependencies for each product of the plurality of products;

display the dependencies for each product of the plurality of products to a user, wherein said displaying comprises visualizing the dependencies via a user interface, wherein the user interface allows for user specification of dependency type and user specification of dependency-related variables comprising lifecycle of a product, cost of a product, and availability of a product; and store the dependencies for each product in a structured format in a database.

21. An apparatus comprising:

means for gathering, from a plurality of unstructured document sources, product data pertaining to a plurality of products, carried out via a distinct software module being embodied on a tangible computer-readable recordable storage medium executing on a hardware processor;

means for extracting, from the product data, dependency information for the plurality of products by identifying mentions of product-related entities and pre-determined synonyms of the product-related entities from the plurality of unstructured document sources, carried out via a distinct software module being embodied on a tangible computer-readable recordable storage medium executing on a hardware processor;

means for analyzing the dependency information to determine dependencies for each product of the plurality of products, carried out via a distinct software module being embodied on a tangible computer-readable recordable storage medium executing on a hardware processor;

means for displaying the dependencies for each product of the plurality of products to a user, wherein said displaying comprises visualizing the dependencies via a user interface, wherein the user interface allows for user specification of dependency type and user specification of dependency-related variables comprising lifecycle of a product, cost of a product, and availability of a product, carried out via a distinct software module being embodied on a tangible computer-readable recordable storage medium executing on a hardware processor; and means for storing the dependencies for each product in a structured format in a database.

* * * * *